United States Patent Office 2,907,362
Patented Oct. 6, 1959

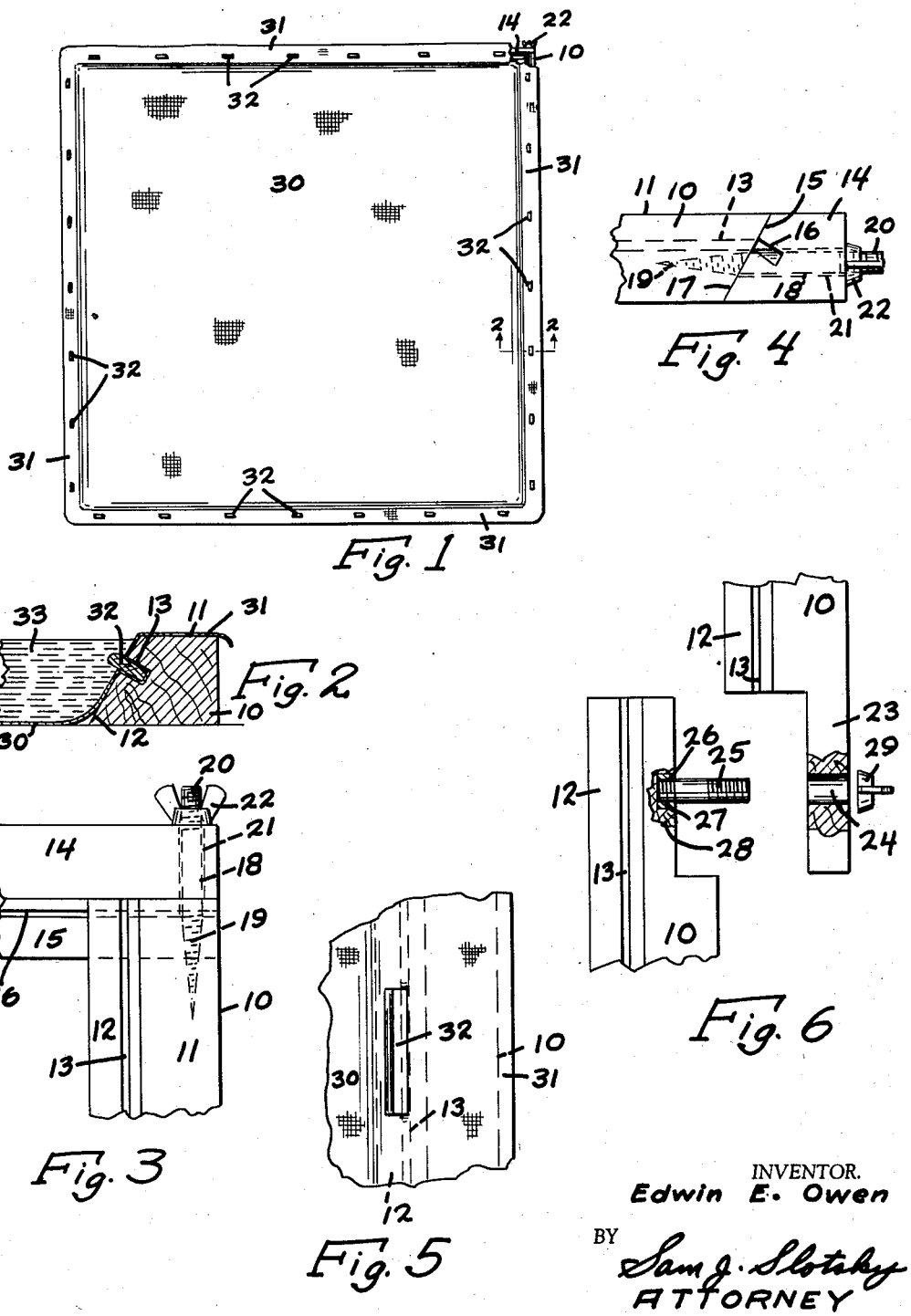

2,907,362
LIQUID CONTAINING STRUCTURE USING PLASTIC FILM

Edwin E. Owen, Minneapolis, Minn., assignor to Raven Industries, Inc., Sioux Falls, S. Dak., a corporation of South Dakota Application April 8, 1957, Serial No. 651,342

1 Claim. (Cl. 150—.5)

My invention relates to a collapsible structure which will efficiently contain a liquid such as water.

An object of my invention is to provide such a structure in an arrangement which can be quickly assembled preferably for home use in order to provide ice skating rinks, or if desired, other structures.

A further object of my invention is to provide a device in which the liquid container, which is of a suitable plastic or rubber film material, is securely held at spaced intervals within the completed framework so as to efficiently contain the water therein.

A further object of my invention is to provide an arrangement which will be of a minimum size when shipped or displayed, and yet can be expanded to a relatively large size for use.

With these and other objects in view, my invention consists in the construction, arrangement, and combination of the various parts of my device, whereby the objects contemplated are attained, as hereinafter more fully set forth, pointed out in my claim, and illustrated in the accompanying drawings, in which:

Figure 1 is a plan view of the assembled arrangement,

Figure 2 is an enlarged sectional view of Figure 1 taken along the lines 2—2 thereof, Figure 3 is an enlarged plan view of a corner of the arrangement, Figure 4 is an end view of Figure 3, Figure 5 is a further enlarged detail showing one of the attaching plugs or inserts in place, and Figure 6 is an exploded view showing one of the joints of the arrangement.

I have used the character 10 to designate one of a pair of parallel preferably wooden lengthened pieces, each having the flat top 11 (see Figure 2), and each including the sloping inner walls 12. Formed in the walls 12 are the lengthened slots 13 which pass throughout the complete length of the piece 10.

I have further used the character 14 to indicate practically identical members, these members also including similarly sloping walls 15 and slots 16. There are thus provided two members 10 and two members 14, and when in use these members are firmly secured at their corners, the members 10 having a sloping wall 17 at each end (see Figure 4) which snugly engage the sloping walls 15.

Firmly screwed into the members 10 are the bolts 18 having the wood screw portions 19 and the threaded portions 20, the transverse members 14 including suitable openings 21 for receiving the bolts 18.

It will be noted from this construction that the corners can thus be firmly secured by merely placing the bolts 18 through the openings 21 since these bolts will be firmly in place, and thence by turning down the wing nuts 22 against the members 14, so that as a result each of the four corners are firmly secured.

The members 10 can also be separated into two sections as shown in Figure 6, wherein one of the sections 10 will include the extending tongue 23 having the opening 24 for the reception of the stud 25 which is suitably threadably engaged at 26 with the metal nut or insert 27 which is firmly secured within the off-set portion 28, it being noted from Figure 6 that the stud 25 can be placed through the opening 24 and a suitable wing nut 29 turned on the threads of the stud 25 to thereby join the two sections of the member 10 securely together, with the corresponding grooves 13 being in alignment as will be the two sections of the members 10, it being obvious that the same construction can be used in the transverse members 14 as well.

After this complete square or rectangular framework is formed in this manner, I provide a similarly shaped sheet of plastic film which is water-proof, and which can be of any other substantially similar substance such as rubber, this complete sheet being indicated by the character 30, and having the integral perimetral portions 31 which are merely laid over the framework, the central portions naturally sagging to the ground. In order to attach the plastic member 30, I provide several plugs or inserts 32 which are relatively long compared to their thickness, and which in actual use can be about two inches in length, and having the general cross section as shown in Figure 2, the thickness of these plugs being less than the width of the slots 13 and 16.

These plugs are placed against the portion of the material 30 which is directly adjacent to the slot 13 or 16, and the plug is then forced inwardly which will naturally carry the plastic film into the slot at this particular point, thereby providing a secure holding means, and several of such plugs are used as shown in Figure 1.

Next, the entire framework can be filled with water, indicated by the character 33 in Figure 2, the arrangement thereby being completely water-tight and firmly held in position.

The device is usually used for providing a home skating rink, the water being allowed to freeze, it being obvious also that any of the corners can be slightly raised or lowered by means of any suitable pieces to provide a level framework.

It will be understood that the device can be made of any desired size or shape, and can be used for other purposes as well.

It will now be seen that I have provided the advantages mentioned in the objects of my invention, with further advantages being readily apparent.

Some changes may be made in the construction and arrangement of the parts of my invention without departing from the real spirit and purpose of my invention, and it is my intention to cover by my claim any modified forms of structure or use of mechanical equivalents which may be reasonably included within its scope.

I claim as my invention:

A liquid containing structure comprising a framework including a plurality of joined lengthened sections, said framework having slots extending continuously about its inner perimeter, a water-impervious sheet of slightly greater size than the area enclosed by said framework, means for securing said sheet to said framework including a plurality of relatively short inserts placed against spaced peripheral portions of said sheet and forced into said slots to thereby securely hold said sheet within said framework, and whereby said sheet can be filled with a liquid.

References Cited in the file of this patent

UNITED STATES PATENTS

| | | |
|---|---|---|
| 362,230 | Schaubel | May 3, 1887 |
| 362,429 | Crowell | May 3, 1887 |
| 1,664,887 | Kirkham et al. | Apr. 3, 1928 |
| 2,232,047 | Block | Feb. 18, 1941 |
| 2,628,364 | Wallace et al. | Feb. 17, 1953 |